United States Patent Office 3,749,622
Patented July 31, 1973

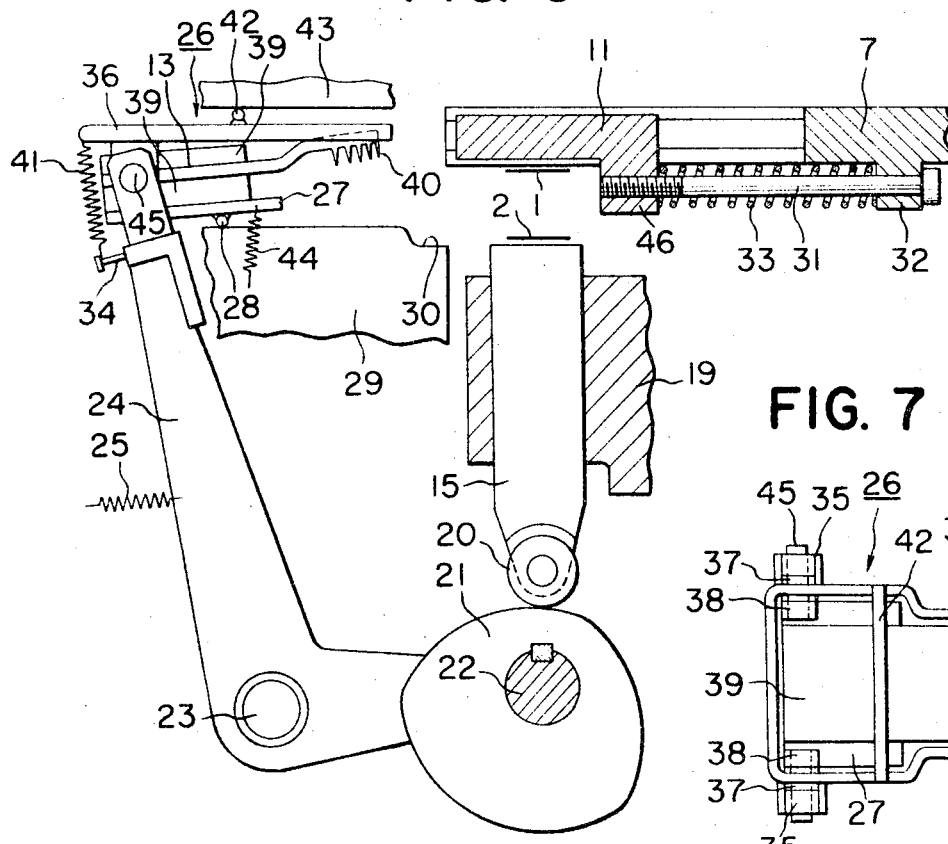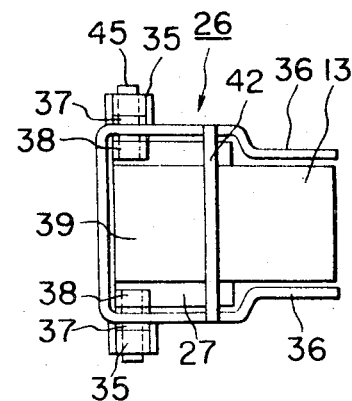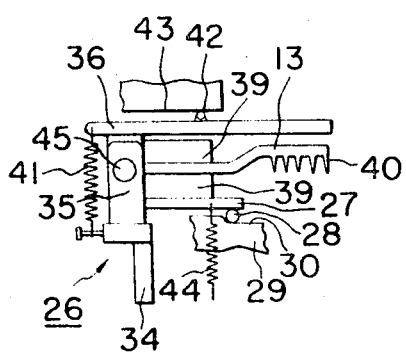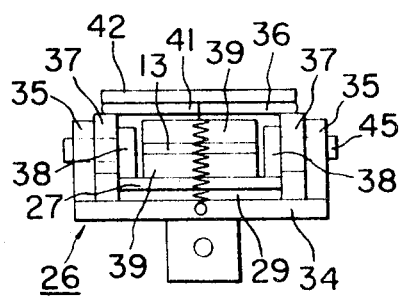

3,749,622
METHOD OF WELDING THERMOPLASTIC BAND FOR USE IN PACKING MACHINE AS WELL AS APPARATUS RELEVANT THERETO
Yoshimasa Sato, Yokohama, and Syozo Togashi, Kawasaki, Japan, assignors to Ikegai Tekko Kabushiki Kaisha, Tokyo, Japan
Filed Nov. 8, 1971, Ser. No. 196,413
Int. Cl. B31f 5/00; B65h 19/00, 69/02
U.S. Cl. 156—157
3 Claims

ABSTRACT OF THE DISCLOSURE

A method of welding applicable to a packing machine for use in strapping the package with a thermoplastic band, which employs an apparatus comprising: a slide plate supporting the overlap portions of the plastic band to be welded; a heat plate which is disposed parallel to the direction of strain of the strapping band and is devised to melt the overlap portions of the plastic band after its advance with the retreat of said slide plate; and a press bar which supports said plastic band at the time of melting and presses the melted overlap portions of said plastic band against the slide plate after the retreat of the heat plate to thereby weld them together.

BACKGROUND OF THE INVENTION (a) Field of the invention

The present invention relates to a method of welding applicable to a packing machine for use in strapping the package by employing a strapping band made of a thermoplastic material such as polypropylene, wherein the both ends of said band is welded while being in the state of tight binding, and an apparatus relevant to said method.

(b) Description of the prior art

As for the conventional method of this kind, such a method as diagrammatically shown in FIGS. 1 and 2 of the appended drawings, which comprises pushing a multiplicity of heated spicular heat members (not shown in said diagrams) against the overlap portion of the both ends $a$ and $b$ of a thermoplastic band; perforating the holes $c$ surrounded by the melted parts $d$; and then welding the melted parts $d$, has heretofore been popular.

However, a band thus welded has been defective in that, when the tensile force works on the ends $a$ and $b$ of said band, its stress converges upon the welding portion surrounding the holes $c'$ and $c''$ located at the both ends of the group of holes $c$ while the stress on the other welding portion decreases, resulting in an insufficient tensile strength of the welded band.

SUMMARY OF THE INVENTION

One object of the present invention is to provide a method of welding a strapping band as well as an apparatus apposite to said method, which can eliminate the foregoing defects accompanying the conventional method, apportion the burdens of tensile force practically uniformly to a wide range of welding portion, and thereby remarkably enhance the strength of the welding portion.

Another object of the present invention is to provide a method of welding a strapping band which comprises thrusting a heat plate disposed parallel to the direction of strain of the strapping plastic band into the overlap portions of said band to thereby melt it partially and welding the band by the thus melted portion thereof by applying pressure, wherein the melted portion is formed parallel to the direction of strain of the band, the tensile force working on the band is apportioned to all parts of the welding portion practically uniformly and the strength of the welding portion of the band is enhanced, as well as an apparatus opposite to said method.

BRIEF DESCRIPTION OF THE DRAWINGS

Of the apended drawings.

FIG. 6 is a schematic representation of fragmental sectional view taken along the line VI—VI in FIG. 5.

FIG. 7 is a schematic representation of plan view of the heating mechanism in FIG. 6.

FIG. 8 is a schematic representation of front view of the same heating mechanism as in FIG. 7.

FIG. 9 is a schematic representation of left-side view of the same heating mechanism as in FIG. 7.

DETAILED DESCRIPTION OF THE INVENTION

Figure 1:
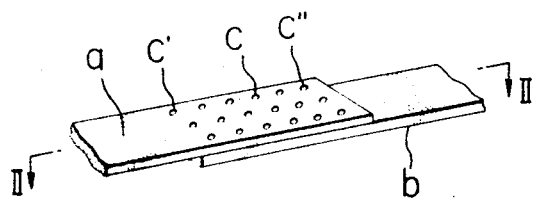
FIG. 1 is a schematic representation of perspective view of the welding portion of a band welded by the conventional welding method.
Figure 2:
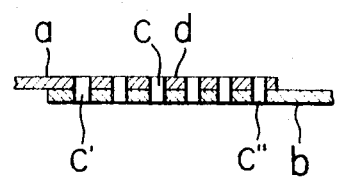
FIG. 2 is a schematic representation of sectional view taken along the line II—II in FIG. 1.
Figure 3:
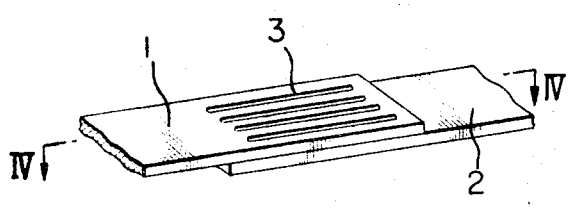
FIG. 3 is a schematic representation of perspective view of the welding portion of a band welded by the welding method according to the present invention.
Figure 4:
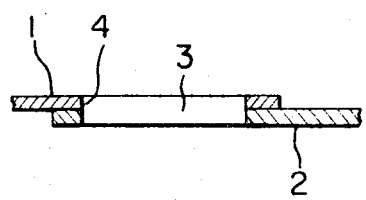
FIG. 4 is a schematic representation of sectional view taken along the line IV—IV in FIG. 3.

FIGS. 3 and 4 respectively show a portion of the band welded by the method of the present invention, and the numeral references 1 and 2 respectively denote the overlap portion of the band, 3 denotes the elongated grooves formed parallel to the direction of strain of the band as a result of its melting effected by the heat plate, and 4 denotes the welding portion surrounding each of said grooves.

Figure 5:
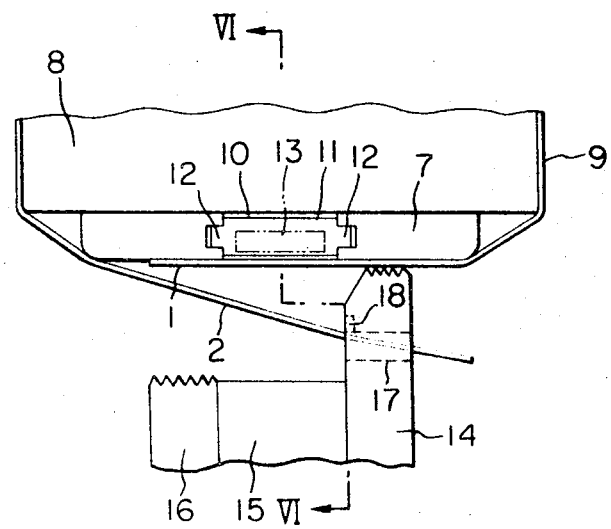
FIG. 5 is a schematic representation of front view of an apparatus which may be utilized in practicing the method of the present invention.

In FIG. 5, the numeral reference 7 denotes the table to put the package 8 thereon, and there is provided the grooved portion 10 of about a right angle to the direction of strain of the band 9 about the center of said table. The slide plate 11 is fitted into this grooved portion 10, and the projections 12 provided on the both side-walls of said slide plate 11 are fitted in slidable fashion into the guide groove provided on the both side-walls of the grooved portion 10. 13 shown by a dotted line denotes the heat plate which end faces the slide plate 11 (cf. FIG. 6). 14 and 16 denote the vertically movable holding members to hold the band by the portions 1 and 2 thereof between the table 7 and said holding members by pressing said band against the table by the both sides of the grooved portion 10, and are provided with teeth on their top. 15 denotes the vertically movable press member disposed between said holding members 14 and 16. The holding member 14 is provided with the hole 17 to run the band 9 therethrough, and the cutter 18 is provided on the upper part of the inside of said hole.

In FIG. 6, the press member 15 is fitted into the guide groove cut in the supporting frame 19, and its lower end is equipped with the roller 20. This roller 20 is engaged with the cam 21 fixed on the shaft 22 pivoted on the frame not shown herein. This shaft 22 is so devised as to rotate by means of the driving gear not shown herein. The holding members 14 and 16 are of the same mechanism as that of the press member 15 so that their illustration may be dispensed with. On the shaft 23 fixed on the frame of apparatus is pivoted the base of the bell crank 24 whose lower arm is provided with a roller (not shown herein) on its end, and this roller is engaged with a cam (not shown herein) fixed on the shaft 22, while the spring 25, whose one end is fixed on the frame of apparatus, is fixed on an appropriate place of the upper arm of the bell crank 24 by the other end thereof so as to pull the bell crank constantly in the direction of the left side of FIG. 6. On the supporting member 34 fixed on the end of the upper arm of the bell crank 24, is pivoted the heating mechanism 26, which details are shown in FIGS. 7-9, by means of the pin 45. Beneath the base plate 27 of this heating mechanism 26, there is provided the projection 28, and, by virtue of the spring 44 installed between the frame of apparatus and the base plate 27, said projection 28 is made to contact constantly with the surface of the stepped guide member 29 fixed on the frame of apparatus. The surface of the stepped guide member 29 is provided with the lower step 20. Above the push bar 36 pivoted on the upper part of the heating mechanism 26, there is provided the transverse bar 42, and between one end of said push bar 36 and the supporting member 34, there is installed the spring 41 so as to make the transverse bar 42 contact constantly with the surface of the guide member 43 fixed on the frame of apparatus. Into the supporting portion 46 of the rear end of the slide plate 11 is screwed the end of the guide rod 31 which penetrates the supporting portion 32, that is, the lower part of the table 7. This guide rod 31 is provided with the spring 33 which coils round its portion between the supporting portions 32 and 46, so that the slide plate 11 is kept away from the table 7 and its end nears the end of the push bar 36, whereby its front bottom comes to be positioned above the press member 15.

FIGS. 7-9 show the details of the heating mechanism 26, wherein the supporting lug 37 of the frame-shaped push bar 36 and the supporting lug 38 of the base plate 27 are pivoted in a row by means of the pin 45 on the brackets 35 provided on the both sides of the supporting member 34, the heat plate 13 equipped with the upper and lower heaters 39 is fixed on the base plate 27, and several blades 40 having an appropriate length are formed, parallel to the direction of strain of the band 9, on the fore part of the heat plate 13.

OPERATION

As shown in FIG. 5, the band 9 is fed through the hole 17 of the holding member 14 by means of the conventional feed mechanism as well as induction mechanism not shown herein to surround the package 8 placed on the table 7, and, when the tip 1 of said band has passed under the grooved portion 10 along the bottom of the table 7, the holding member 14 is elevated by means of a cam (not shown herein) fixed on the rotary shaft 22, whereby the tip 1 of the band is sandwiched in between the top of the holding member 14 and the bottom of the table 7 and pressured thereby.

Subsequently, the holding member 16 is elevated in the same way as the foregoing holding member 14 to push up the band 9 strained aslant downwards, whereby said band 9 is sandwiched in between the top of the holding member 16 and the bottom of the table 7 and brought into the state of being strained aslant between the end of the sandwiched portion and the edge of the cutter 18.

Figure 10:
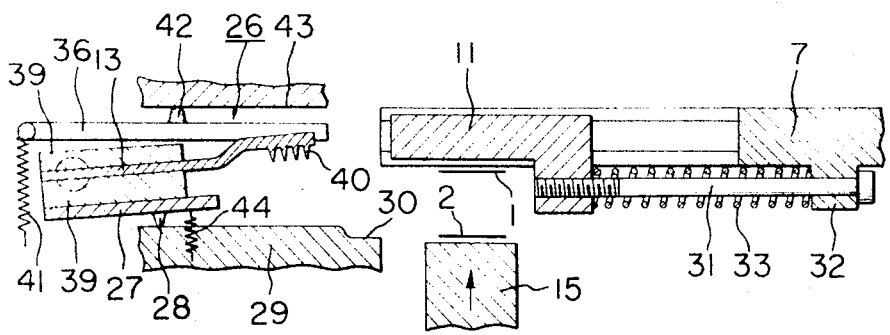
FIGS. 10–14 are illustrations to explain the order of movements of the heat plate in relation to the band.

At this moment, the press member 15 engaged with the cam 21 through the roller 20 is elevated as said cam 21 rotates by virtue of the rotation of the shaft 22, whereby the band 9 is cut by the synergy of the top of the press member 15 and the cutter 18 and the cut end of the band 9 sildes up along the side-wall of the holding member 14. On this occasion, by means of a cam (not shown herein) fixed on the shaft 22, the lower arm of the bell crank 24 is pushed down to thereby turn the upper arm thereof clockwise in defiance of the tension of the spring 25 in FIG. 6, and, as a result, the heating mechanism 26 pivoted on the supporting member 34 starts moving forwards while making the transverse bar 42 and the projection 28 slide on the guide member 43 of the table 7 and the surface of the upper step of the stepped guide member 29. At this juncture, the fore bottom of the slide plate 11 pushed by the spring 33 is located above the press member 15, and the head of the guide rod 31 is engaged with the supporting portion 32 of the table 7 and rests in that condition (cf. FIG. 10).

Figure 11:
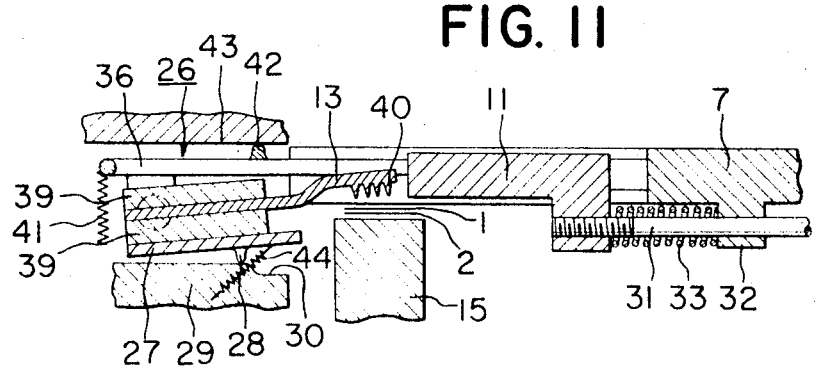

With further advance of the heating mechanism 26, the push bar 36 constituting a part of said mechanism strikes the front of the slide plate 11 confronting it and makes the slide plate 11 move back in defiance of the push by the spring 33, whereby the heat plate 13 is brought to a position above the overlap portions 1 and 2 of the band placed on the press member 15 (cf. FIG. 11).

Figure 12:
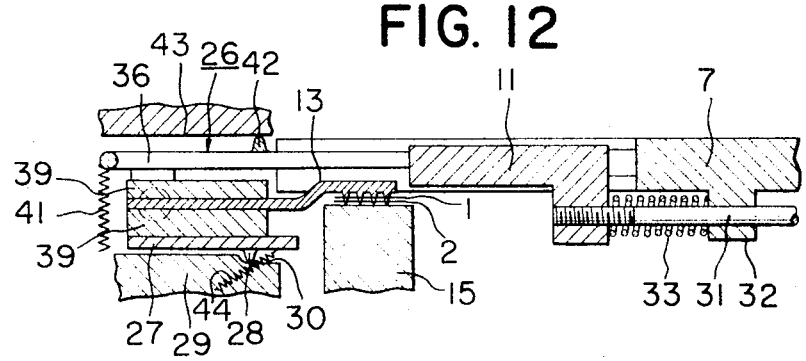
Figure 17:
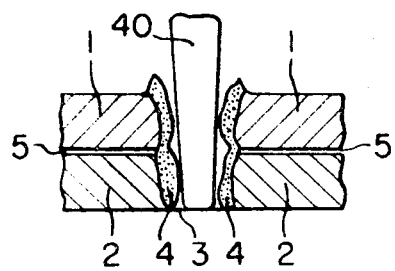
FIG. 17 is a diagrammatic sectional view, on an enlarged scale, of the melted portion of the band on the ocassion of melting.
Figure 18:
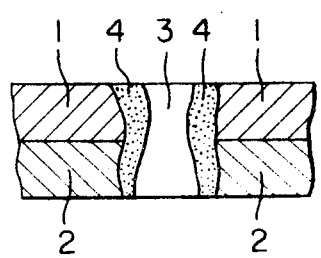
FIG. 18 is a diagrammatic sectional view, on an enlarged scale, of the welding portion of the band after welding.

When the heating mechanism 26 advances a little more subsequent thereto, the projection 28 provided on the bottom of the base plate 27—which plate is always being pulled downwards by the spring 44—slides down onto the lower step 30 of the guide member 29 to turn the base plate 27 downwards centering around the pivot, and, as a result, the heat plate 13 descends and the blades 40 thereof are thrusted into the overlap portions 1 and 2 of the band to penetrate them, whereby the melting is effected (cf. FIGS. 12 and 17).

At this, the bell crank 24 turns anticlockwise, and, as a result, the heating mechanism 26 starts moving back, the projection 28 slides up to the upper step from the lower step 30 of the guide member 29 at the time of this movement, whereby the heat plate 13 ascends to pull out the blades 40 from the overlap portions 1 and 2 of the band, and, at the same time, the slide plate 11 advances due to the retreat of the push bar 36 and the push by the spring 33. When the bottom surface of the slide plate 11 has come to cover the upper surface of the overlap portions 1 and 2 of the band, the head of the guide rod 31 is engaged with the supporting portion 32 of the table 7 and stops. Meanwhile, the heating mechanism 26 keeps moving back until it returns to its initial position and stops there (cf. FIG. 13).

Figure 13:
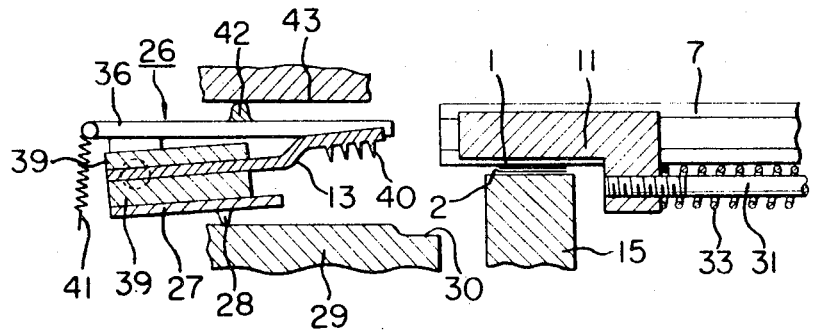
Figure 14:
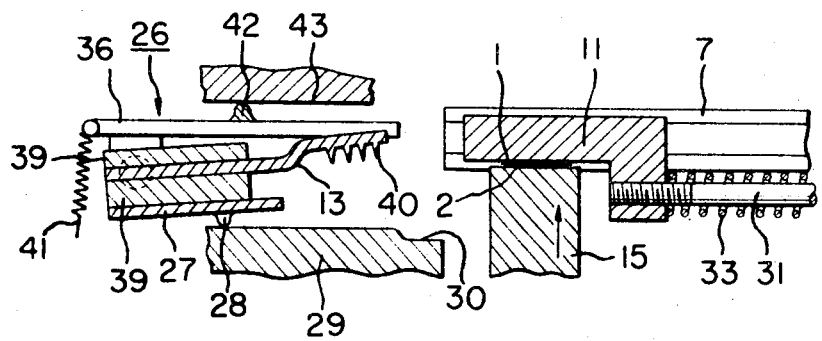

In the conditions shown in FIGS. 11, 12 and 13, the press member 15 resting in the position as illustrated is next pushed up to some extent to press the overlap portions 1 and 2 of the band between its upper surface and the bottom surface of the slide plate 11. By virtue of this pressing, the melted portions 4, which are somewhat separated due to the gap 5 between the overlap portions 1 and 2 of the band, get uniformly welded, and the overlap portions 1 and 2 of the band stick fast to each other (cf. FIG. 14).

Figure 15:
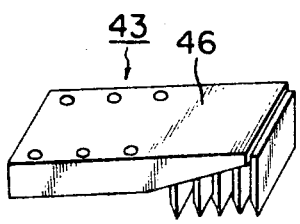
FIG. 15 is a schematic representation of perspective view of another embodiment of the heat plate according to the present invention.
Figure 16:
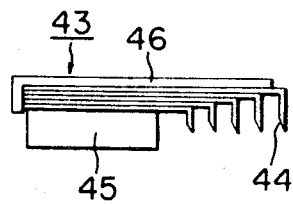
FIG. 16 is a schematic representation of fragmental front view of the heat plate in FIG. 15 as cut longitudinally.

FIGS. 15 and 16 show the heat plate 43 of another mode, wherein a plurality of hook-shaped heat blades 44 put one upon another by disposing their edges at regular intervals are fixed on the cover 46 along with the heater 45, and this heat plate 43 is supposed to be fixed on the base plate 27 in the same way as in case of the foregoing heat plate 11.

Although particular preferred embodiments of the present invention have been disclosed hereinabove for the purpose of illustration, it will be understood that variations or modifications thereof which lie within the scope of the invention as defined by the appended claims are fully contemplated.

What is claimed is:

1. A method of welding applicable to a packing machine for use in strapping the package with a thermoplastic band, which comprises: melting the overlap portions of said plastic band to be welded by pushing a heat plate provided with a plurality of blades disposed parallel to the direction of strain of the band; and welding said overlap portions by applying pressure onto the thus melted portion of the band subsequent thereto.

2. An apparatus for welding applicable to a packing machine for use in strapping the package with a thermoplastic band, which comprises: a slide plate to support the overlap portions of said plastic band to be welded; a heat plate disposed parallel to the direction of strain of the plastic band for the purpose of melting the overlap portions of the band in the wake of the advance of the heat plate with the retreat of said slide plate; and a press bar for the purpose of supporting the plastic band at the time of melting thereof and pressing the melted portions of the band against the slide plate in the wake of the retreat of the heat plate to thereby weld the band by the melted portions thereof.

3. An apparatus for welding applicable to a packing machine for use in strapping the package with a thermoplastic band, which comprises: a slide plate to support the overlap portions of said plastic band to be welded; a heat plate which is prepared by integrating several heat blades put upon one another and provided with heating edges parallel to the direction of strain of the band for the purpose of melting the overlap portions of the band in the wake of the advance if the heat plate with the retreat of said slide plate; and a press bar for the purpose of pressing the melted portions of the band against the slide plate in the wake of the retreat of the heat plate to thereby weld the band by the melted portions thereof.

References Cited
UNITED STATES PATENTS

| | | | |
|---|---|---|---|
| 2,926,720 | 3/1960 | Gosman | 156—145 X |
| 2,982,069 | 5/1961 | England | 156—502 X |
| 3,368,323 | 2/1968 | Wood | 156—157 X |
| 3,392,504 | 7/1968 | Vates | 156—290 X |
| 3,442,732 | 5/1969 | Stensaker et al. | 156—73 |
| 3,442,733 | 5/1969 | Vilcins | 156—73 |

WILLIAM A. POWELL, Primary Examiner

U.S. Cl. X.R.

53—198; 156—290, 306, 502, 553, 583; 161—146